United States Patent [19]

McAtee et al.

[11] Patent Number: 4,699,749

[45] Date of Patent: Oct. 13, 1987

[54] CONTROLLING A NUCLEAR REACTOR WITH DROPPED CONTROL RODS

[75] Inventors: Kevin R. McAtee, Plum Boro; Brian H. Alsop, Penn Township, Westmoreland County, both of Pa.

[73] Assignee: Westinghouse Electric Corp., Pittsburgh, Pa.

[21] Appl. No.: 731,259

[22] Filed: May 7, 1985

[51] Int. Cl.[4] .............................................. G21C 7/36
[52] U.S. Cl. ................................... 376/216; 376/238; 376/242
[58] Field of Search ............... 376/215, 216, 217, 238, 376/258, 219, 242

[56] References Cited

U.S. PATENT DOCUMENTS

| | | | |
|---|---|---|---|
| 3,423,285 | 1/1969 | Curry et al. | 376/217 |
| 4,016,034 | 4/1977 | Musick. | |
| 4,055,463 | 10/1977 | Torres | 376/217 |
| 4,069,097 | 1/1978 | Frank | 376/217 |
| 4,299,657 | 11/1981 | Abenhaim et al. | 376/217 |
| 4,318,778 | 3/1982 | Musick | 376/216 |
| 4,399,095 | 8/1983 | Morris | 376/216 |
| 4,470,949 | 9/1984 | Deroubaix et al. | |
| 4,548,784 | 10/1985 | Watari | 376/216 |

FOREIGN PATENT DOCUMENTS

| | | |
|---|---|---|
| 1177180 | 10/1984 | Canada. |
| 0051542 | 10/1981 | European Pat. Off.. |
| 0128834 | 6/1984 | European Pat. Off.. |

Primary Examiner—Deborah L. Kyle
Assistant Examiner—Daniel Wasil
Attorney, Agent, or Firm—Daniel C. Abeles

[57] ABSTRACT

In a pressurized water reactor in which a dropped control rod is detected by a negative rate of change of neutron flux which exceeds a preset negative limit, the reactor is only shutdown if the axial offset exceeds a preselected limit, so that it is possible to maintain power, and in many cases full power, despite the presence of a dropped rod. Where part length control rods are used during power changes, separate limiting values on axial offset are used when these rods are fully inserted and when they are fully retracted.

9 Claims, 2 Drawing Figures

CONTROLLING A NUCLEAR REACTOR WITH DROPPED CONTROL RODS

BACKGROUND OF THE INVENTION

1. Field of the Invention

This invention relates to a method and apparatus for controlling a nuclear reactor under dropped control rod conditions, and more particularly for shutting down the reactor only if the dropped rod condition causes the axial power distribution to exceed prescribed limits.

2. Prior Art

One means for controlling the reactivity of a commercial nuclear reactor such as a pressurized water reactor (PWR) is through insertion of control rods into the reactor core. The control rods absorb neutrons to control the number of fission reactions. Since the control rods are inserted into and withdrawn from the upright, generally cylindrical core along a vertical path, they have a direct effect on the axial distribution of the fission reactions, and hence the power generated, in the core. Skewing of the power generated in the core in the axial direction due to the effect of the control rods is commonly measured in terms of a quantity such as axial offset or axial shape index which reference skewing of power toward the top and bottom of the core respectively. Operational constraints placed on the axial distribution of power in the core are translated into limits on axial offset or axial shape index which, if exceeded, lead to tripping or shutting down of the reactor through full insertion of all the control rods.

PWRs have both full length control rods which extend all the way through the core and part length rods which cover only portions of the core. The full length rods may be inserted to any depth in the core while the part length rods are either fully inserted or fully retracted. In those reactors in which the part length rods are manipulated during power changes, the position of these rods makes a substantial difference in the critical limits on axial offset or axial shape index.

Both the full length and part length control rods are inserted and retracted in groups consisting of rods located symmetrically about the vertically oriented axis of the generally cylindrical core such that normal movement of the control rods does not cause an imbalance in the radial distribution of power. However, the rods are incrementally stepped into and out of the core by electromechanical jacks which can, on occasion, malfunction resulting in the dropping of a rod into the core, thereby distorting the axial distribution of power. The nature of the operation of a PWR is such that the reactor attempts to make up for the local loss of reactivity caused by the dropped rod by increasing the power elsewhere in the core so that the demand placed upon the reactor is still met. This in turn, can lead to local limits being exceeded in these other parts of the core.

One type of protection system provided on PWRs monitors the neutron flux and trips the reactor when a negative rate of change of flux in excess of a preselected value is detected. Such a negative rate of change in neutron flux can for example, indicate a dropped rod since the inserted rod reduces the local reactivity and it takes time for the power to increase elsewhere in the core and thus, return the power to the demanded level. The control rod drives in PWRs are such that dropping of control rods may occur during an operating cycle. The current protection system for these plants will usually respond to a dropped rod by tripping the reactor. The combined effect of several trips could result in a significant capacity factor loss.

It is not necessary, however, to trip the reactor if local power peaks can be maintained below design limits. Accordingly, commonly owned U.S. Pat. No. 4,399,095 proposes that while the reactor should be tripped upon the occurence of a very large negative flux change, for a more moderate drop in power the reactor can continue to operate as long as the power does not exceed the reduced power level initially resulting from the dropped rod by a preselected amount. It also calls for limits on rod withdrawal and a rollback in turbine power to maintain reactor power below the new limit.

It is a primary object of the present invention to provide a method and apparatus for controlling a nuclear reactor which permits the reactor to operate at full power with a dropped rod as long as local peak power in the core does not exceed design limits.

SUMMARY OF THE INVENTION

The above object and others are realized by the invention which derived from our analysis of dropped rod incidents and our determination that local power peaking limits will be exceeded only if the dropped rod condition results in skewing of the axial power distribution, as measured for instance by the axial offset, by an amount which exceeds specified limits. More specifically, in accordance with the invention, when a dropped rod condition is detected, the plant is permitted to operate at the demanded power level, even 100% power, as long as a preselected axial power distribution limit is not exceeded. However, if the axial power distribution limit is exceeded, the reactor is shut-down. In plants where the part length rods are manipulated during power changes, separate limits are established for axial power distribution for the fully inserted and fully retracted positions of these rods. The dropped rod condition is detected by a negative rate of change of the neutron flux which is greater than a present limit. A negative rate of change in flux which exceeds a second, more negative limit, which is indicative of a severe abnormal condition, results in an immediate reactor trip regardless of the axial power distribution,

BRIEF DESCRIPTION OF THE DRAWINGS

A full understanding of the invention can be gained from the following description when read in conjunction with the accompanying drawings in which.

DESCRIPTION OF THE PREFERRED EMBODIMENT

Figure 1:
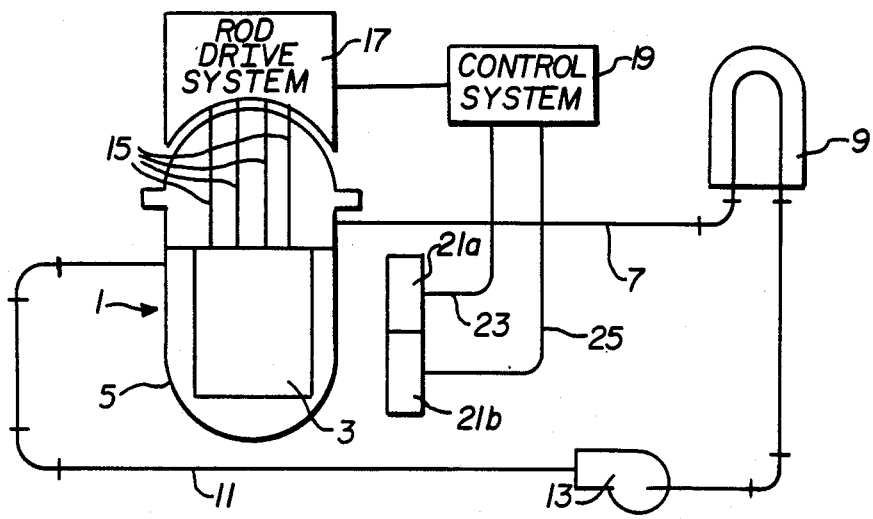
FIG. 1 is a schematic diagram of a pressurized water reactor steam generating system incorporating the invention.

FIG. 1 illustrates the nuclear steam supply system of a pressurized water reactor (PWR) nuclear power generating unit which embodies the present invention. The system comprises a nuclear reactor 1 which includes an upright, generally cylindrical reactor core 3 housed in a pressure vessel 5. The core 3 contains fissionable material in which sustained fission reactions occur to generate heat which is absorbed by reactor coolant in the form of light water passed through the core 3. The reactor coolant is circulated in a primary loop which includes a hot leg conduit 7 to convey the heated reactor coolant from the reactor core 3 to the primary side of a steam generator 9 where the heat is transferred to feed water on the secondary side to produce steam. This steam is utilized in a secondary loop (not shown) in a well-known manner to drive a turbine-generator set (also not shown) which produces electric power. The reactor coolant is returned to the reactor core 3 through a cold leg conduit 11 by a reactor coolant pump 13. While one primary loop is shown in FIG. 1 for illustration, in practice a typical PWR has two to four primary loops each serving its own steam generator.

Long term adjustment of the reactivity of the reactor core 3 is controlled by disolving a neutron absorbing material such as boron in the reactor coolant which is circulated through the core. The reactor coolant also serves as a moderator to slow the fast neutrons released by the fission reactions down to the energy levels required for sustained fission reactions. A PWR possesses a negative temperature moderator coefficient in that as the water becomes cooler and hence denser, it slows down more fast neutrons to the critical level for fission and thus increases the reactivity of the core.

The reactivity of the core 3 is also regulated by control rods 15 made of neutron absorbing material which are inserted into the core 3 vertically from above. The control rods 15 are positioned by a control rod drive system 17 under the direction of a control system 19. Since the control rods move in the axial direction within the core, they have an affect on the axial distribution of core power. Some of the control rods 15 are part length rods which in some installations are used to help control the axial distribution of power within the core. In all installations, the positioning of the control rods is managed by the control system 19 to maintain the axial distribution of power within prescribed limits.

It has long been recognized that the power generated by the reactor 1 is proportional to the fast neutron flux escaping from the core 3. Hence, the power is typically measured by elongated neutron detectors 21 (one shown) extending vertically at spaced locations around the pressure vessel 5. These detectors have upper and lower sections 21a and 21b which provide separate indications of the power in the upper and lower portions of the core 3 respectively. The usual practice is to provide four such neutron detectors spaced evenly around the pressure vessel to generate four independent measurements of the neutron flux. The redundancy provided by the mulitple detectors assures the reliability required for protection and control purposes. The separate flux measurement made by the upper and lower halves 21a and 21b of the neutron detectors are transmitted to the control system 19 over lines 23 and 25 respectively.

The control system 19 processes the neutron flux signals from the detectors 21a and 21b to calculate the axial offset in accordance with the formula:

$$\text{Axial Offset} = \frac{\text{power upper half} - \text{power lower half}}{\text{power upper half} + \text{power lower half}}$$

This axial offset is a measurement of the skewing of power within the core in the axial direction. A typical scheme for operating a PWR is to maintain the axial offset at a preselected value, which changes through the fuel cycle, during normal operation of the reactor. A typical target value for the axial offset expressed as a percentage is +2 to 3% with an operating band which typically ranges upwards to 7%. If the axial offset drifts outside of this band, the power is reduced to bring it back within limits. As previously mentioned, skewing of the power can also be measured in terms of axial shape index which reverses the terms in the numerator in the above equation thereby referencing the index to the bottom of the core.

Under normal operating conditions, radial power distribution within the core is not a concern because movement of the control rods is synchronized to provide symmetry about the longitudinal axis of the core. Provision is made, however, for the possibility that that symmetry could be broken for instance by a dropped rod. Due to the physics of a PWR, the dropped rod will cause an immediate decrease in the power generated in the vicinity of the dropped rod which will initially result in a reduction in the total power generated by the core. The reactor will then attempt to meet the load placed upon it by the demand for steam in the secondary loops by increasing power in the remainder of the core, which as mentioned previously, could lead to local overheating elsewhere in the core.

The present invention addresses this problem by detecting the dropped rod condition but shutting the reactor down only when conditions warrant. Our analysis has shown that unprogrammed insertion of certain rods has more affect on other portions of the core than other dropped rods. The effects of the dropping of the various rods into the core were considered for the worst case condition which occurs when there is a large amount of reactivity, available through dilution of the boron in the reactor coolant, through a drop in reactor coolant temperature and through withdrawal of partially inserted control rods. The limiting factor is the departure from nucleate boiling ratio (DNBR) limits. We have determined that as long as the axial offset remains within identifiable limits, applicable to all dropped rod conditions, the DNBR limits for all other localities in the core will not be exceeded and it is not necessary therefore to shutdown the reactor. The situation is aided to some extent by the fact that the dropping of multiple control rods reduces the reactivity to the extent that the power is automatically reduced to a safe level even with the resultant radial peaking of power.

Figure 2:
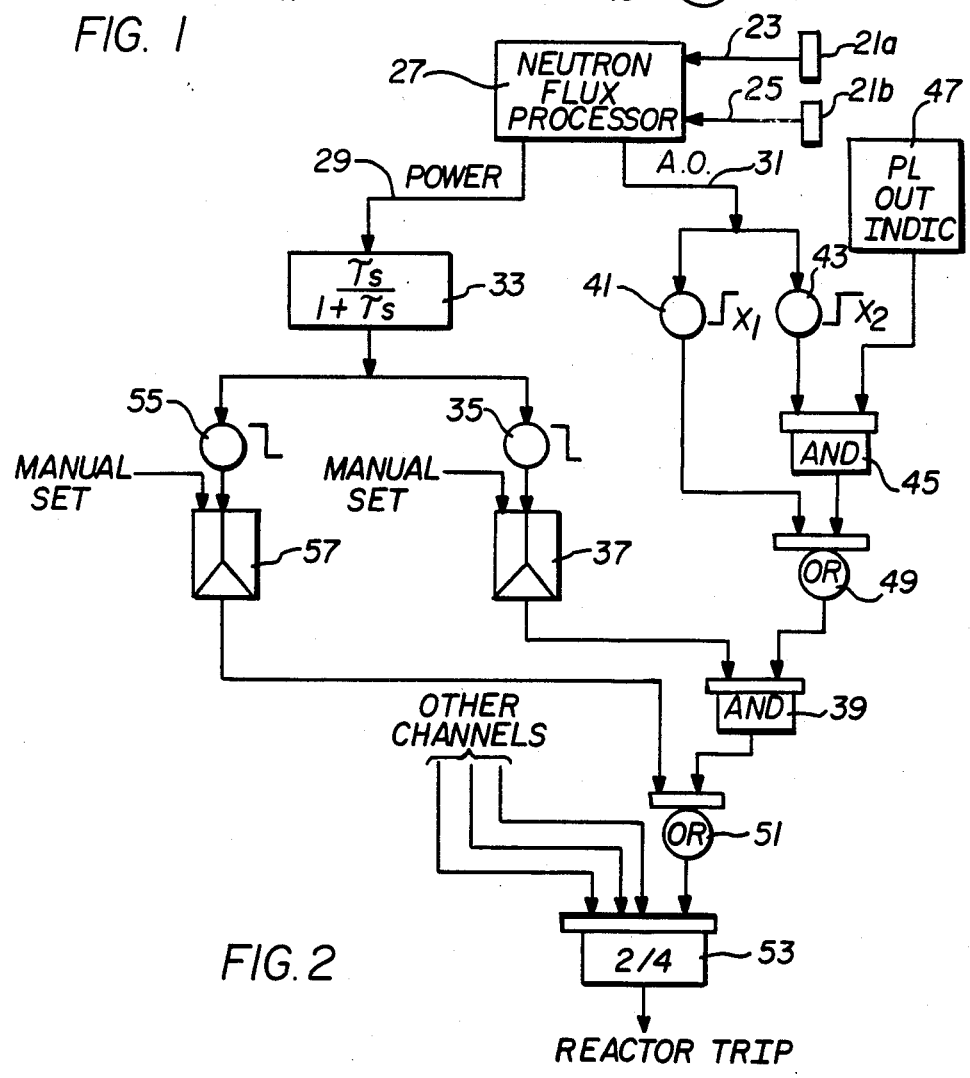
FIG. 2 is a schematic diagram of a portion of the control system of the pressurized water reactor steam generating system of FIG. 1 in accordance with the teachings of the invention.

In the present invention, a dropped rod condition is detected in a manner similar to that used in U.S. Pat. No. 4,399,095, i.e. by monitoring the negative rate of change of the fast neutron flux. Novel means are then used to determine whether the dropped rod condition warrants shutting down the reactor. FIG. 2 illustrates schematically a portion of the control system 19 of FIG. 1 for implementing the invention. A similar circuit is provided for each of the detector channels 21. The output of each half 21a and 21b of each fast neutron detector is applied to a neutron flux processor 27 which sums the two outputs to generate a power signal on line 29 and generates an axial offset signal which is calculated according to the formula set forth above and applied to line 31. The power signal is applied to a conventional dynamic rate-lag compensation circuit 33 which generates an output representative of the rate of change in the power. If the output of the dynamic rate-lag circuit is negative enough to exceed a preselected setpoint characteristic of a dropped rod, a negative rate bistable 35 will change state. The change of state of the bistable 35 is stored by a memory unit 37 which maintains the stored bistable output until manually reset.

Thus, while the flux will subsequently rise as other portions of the core respond to meet the load demand, the indication of the dropped rod condition is preserved. The output of the memory unit 37 is applied to an AND circuit 39.

The axial offset signal on lead 31 is compared with two axial offset setpoint signals $X_1$ and $X_2$ in bistables 41 and 43 respectively. The output of bistable 43 is applied to an AND gate 45 together with a signal from a part length rod out indicator 47. If the part length rods are out and the axial offset exceeds the set point value $X_2$, a signal is applied by AND gate 45 to an OR gate 49. On the other hand, if the part length rods are in, and the axial offset exceeds the set point value $X_1$, bistable 41 will apply a signal to OR gate 49. Either signal is applied by OR gate 49 to AND gate 39 together with the output of the memory circuit 37. If the memory 37 has been set to indicate a dropped rod condition, AND 39 gates either signal indicating that an axial offset limit has been exceeded to an OR gate 51 which, in turn, applies a signal to a two out of four voting logic circuit 53 together with similar signals from the other channels. If a signal is also applied to the two out of four voting logic circuit 53 by any other channel, a reactor trip signal is generated. The reactor trip signal is applied to the rod drive system 17 to insert all of the control rods into the core to shut the reactor down.

The output of the rate lag circuit 33 is also compared with a second set point signal in a bistable 55. The value of the set point signal applied to the bistable 55 is selected to be indicative of a rate of decrease in reactor power so severe as to require immediate shutdown of the reactor. Thus, if this set point value is exceeded, the signal generated by the bistable 55 is stored in a memory unit 57 and is applied through the OR gate 51 to the two out of four logic circuit 53 until the memory is manually reset. Again, at least one other channel must also apply a signal to the two out of four voting logic circuit 53 in order to generate a reactor trip. This trip generated when the decrease in flux rate exceeds the set point applied to the bistable 55 is the conventional high flux rate trip signal currently provided in PWRs, and is shown here to illustrate how this trip interfaces with the invention.

As mentioned, the set point value for the decrease in flux rate applied to bistable 35 is selected to indicate a dropped rod condition. An exemplary value for this set point corresponds to a value obtained when a 0.05 to 0.1% reactivity worth control rod is dropped into the core. Typical values for the axial offset set point signals applied to the bistables 41 and 43, respectively, which would cause a reactor to trip under a dropped rod condition are approximately +10% with the part length rods out and approximately 0% with the part length rods in.

With the present invention, the reactor is only shutdown if axial offset limits indicative of unacceptable local power peaks are exceeded and the reactor can often be run at full power with a dropped control rod. Thus, the invention reduces the likelihood of interruption of reactor operation when a control rod is dropped and allows greater utilization of the reactor under these conditions.

While specific embodiments of the invention have been described in detail, it will be appreciated by those skilled in the art that various modifications and alternatives to those details could be developed in light of the overall teaching of the disclosure. Accordingly, the particular arrangements disclosed are meant to be illustrative only and not limiting as to the scope of the invention which is to be given the full breadth of the appended claims and any and all equivalents thereof.

What is claimed is:

1. A control system for a nuclear power plant including a reactor with a core having an upper portion and a lower portion and control rods which are inserted into and withdrawn from the core of the reactor vertically to control reactivity in the core, said system comprising:

means to measure neutron flux separately in the upper portion and the lower portion of the reactor and to generate from such measurements a signal representative of axial distribution of power between the upper and lower portions of the reactor core;

means to detect a dropped control rod in the reactor and to generate a dropped rod signal in response thereto;

means to generate an axial power distribution limit signal representative of a critical axial power distribution for a dropped rod condition;

means to compare said axial power distribution signal to said axial power distribution limit signal and to generate an axial power distribution out of limits signal when said axial power distribution signal exceeds the axial power distribution limit signal; and means responsive only to the presence of both said dropped rod signal and the axial power distribution out of limits signal to generate a signal for shutting the reactor down.

2. The control system of claim 1 for use in a reactor in which the control rods include part length control rods and full length control rods which may be inserted into and withdrawn from the reactor core, said system including means to indicate the position of said part length control rods and wherein said means to generate an axial power distribution limit signal generates an axial power distribution limit signal of a first selected value in response to an indication by said indicating means that said part length control rods are inserted in said reactor core and to generate an axial power distribution limit signal of a second value in response to an indication that said part length rods are withdrawn from the reactor core such that said reactor is shutdown in the presence of a dropped rod condition for a first value of axial power distribution when the part length control rods are inserted and for a second value of axial power distribution when the part length control rods are withdrawn from the reactor core.

3. The control system of claim 1 wherein said means to detect a dropped control rod in the reactor includes means for monitoring reactor neutron flux and means for generating said dropped rod signal when a negative rate of change in reactor flux more negative than a first preset flux rate limit is detected.

4. The control system of claim 3 wherein said means to detect a dropped control rod in the reactor also includes means for generating a reactor trip signal when a negative rate of change in reactor flux more negative than a second preset flux rate limit, which in turn, is more negative than said first preset flux rate limit, is exceeded.

5. A method of controlling a nuclear power plant including a reactor with a core having an upper portion and a lower portion and control rods which are inserted into and withdrawn from the core vertically to control reactivity, said method comprising the steps of:

measuring separately on an on-line basis the neutron flux in the upper portion and the lower portion of the reactor core;

generating from said measurements of the neutron flux in the upper and lower portions of the reactor core a signal representative of the axial distribution of power between the upper and lower portions of the reactor core;

monitoring the operation of the reactor and generating a dropped rod signal in response to the detection of an uncommanded insertion of a control rod into the reactor core;

generating an axial power distribution limit signal representative of a selected critical value of the axial power distribution signal for a dropped rod condition;

comparing, in response to the generation of a dropped rod signal, the axial power distribution signal to the axial power distribution limit signal; and shutting down the reactor when the axial power distribution signal exceeds the axial power distribution limit signal only in the presence of a dropped rod signal.

6. The method of claim 5 wherein said step of monitoring the operation of said reactor and generating a dropped rod signal comprises the steps of monitoring said neutron flux measurements and generating the dropped rod signal when the rate of change of the neutron flux is more negative than a first preselected negative value.

7. The method of claim 5 wherein said control rods include part length control rods and full length control rods, wherein said method includes the step of monitoring the position of said part length control rods and wherein said step of generating an axial power distribution limit signal includes generating an axial power distribution limit signal of a first value when said part length rods are inserted into the reactor core and generating an axial power distribution limit signal having a second value when the part length control rods are withdrawn.

8. The method of claim 6 including the step of shutting down the reactor when the rate of change of the neutron flux is more negative than a second preselected negative value which is more negative than the first preselected negative value.

9. In combination:

a nuclear reactor with a core having an upper and lower portion;

control rods insertable vertically into said reactor core;

means to insert said control rods in and to withdraw them from said core to control the reactivity of the core;

means to measure the neutron flux separately in the upper and lower portions of the reactor core and to generate from such measurements a signal representative of the axial distribution of power between the upper and lower portions of the reactor core and a signal representative of the total neutron flux in both the upper and lower portions of the reactor core;

means responsive to the total neutron flux signal to generate a dropped control rod signal when the rate of change of the total neutron flux signal is more negative than a preset negative limit;

means to generate an axial power distribution limit signal representative of a critical axial power distribution for a dropped rod condition;

means to compare said axial power distribution signal to said axial power distribution limit signal and to generate an axial power distribution out of limits signal when said axial power distribution signal exceeds the axial power distribution limit signal; and means responsive only to the presence of both said dropped rod signal and the axial power distribution out of limits signal to generate a reactor trip signal, said means for inserting and withdrawing said control rods being responsive to said reactor trip signal to fully insert said control rods into the reactor core.

* * * * *